United States Patent Office 3,222,397
Patented Dec. 7, 1965

3,222,397
FUMARYL DICHLORIDE BY THE CATALYZED REACTION OF FUMARIC ACID AND PHOSGENE
Erach R. Talaty, Cambridge, Mass., assignor to Pittsburgh Plate Glass Company, Pittsburgh, Pa., a corporation of Pennsylvania
No Drawing. Filed Jan. 2, 1962, Ser. No. 163,872
6 Claims. (Cl. 260—544)

This invention involves the preparation of fumaryl dichloride. It has been discovered fumaric acid and phosgene may be reacted to provide fumaryl dichloride, the dibasic acid chloride of fumaric acid. By virtue of the present invention, a novel relatively simple method for preparing fumaryl dichloride in good yield is provided.

Pursuant hereto, phosgene and fumaric acid are catalytically reacted using a formamide catalyst, notably dimethylformamide. Thus, in accordance with this invention, appropriate mole proportions of phosgene and fumaric acid (e.g., at least about 2 moles of phosgene per mole of fumaric acid) are contacted in a liquid reaction medium which contains a catalytic concentration of dimethylformamide, ideally under essentially anhydrous conditions, for a period of time sufficient to effect reasonable conversion. The reaction does not proceed rapidly to completion; thus, contact periods (reaction times) in excess of 10 minutes, often up to 24 hours, are quite common in attaining optimized yields.

Temperatures are consistent with provision and maintenance of a liquid reaction medium. Fumaryl dichloride yields are greatest when the reaction medium temperature is not in excess of about 75° C., but above 30° C.

The following example illustrates the performance of the present invention:

Example

A three-necked, one-liter, round bottomed glass flask fitted with an inlet tube, stirrer, thermometer and Dry Ice-acetone condenser serving as the reaction vessel was charged with 0.5 mole of fumaric acid, 200 milliliters of 1,2,4-trichlorobenzene and 0.058 mole of N,N-dimethylformamide. A total of 1.68 moles of phosgene gas was gradually introduced at a substantially uniform rate through the inlet tube into the liquid composition in the flask over a period of 7 hours while the liquid was maintained at from 50° C. to 55° C.

Fumaryl dichloride in the resulting composition was obtained by first filtering and then distilling the filtrate under nitrogen through a column packed with glass helices to obtain a distillate fraction which was primarily fumaryl dichloride. A 66 percent yield of fumaryl dichloride (based upon fumaric acid charged) was obtained.

While the foregoing example refers to specific details, considerable latitude is permissible in performing the present invention. For example, in lieu of 1,2,4-trichlorobenzene, other useful relatively inert (under the conditions of reaction) normally liquid organic solvent diluents for the reactants include such aromatic solvents as 1,2,4,5-tetrachlorobenzene, monochlorobenzene, 2,4-dichlorobenzene, 1,2,5-trichlorobenzene and nitrobenzene. Preference is usually for these and like inert solvents having normal boiling points above that of the reaction temperature.

Stoichiometric excesses of phosgene, although giving better yields based on fumaric acid, are not essentail to obtaining fumaryl dichloride. When using a phosgene excess, the excess is normally from 10 to 300 percent of stoichiometric. A solution of phosgene, e.g., phosgene dissolved in a solvent or diluent of the type used in the reaction medium, may constitute the form in which phosgene is added to the reaction medium.

Catalyst concentrations range from 0.01 to 0.2 mole of dimethylformamide per mole of fumaric acid for most purposes. Higher concentrations of dimethylformamide raise costs without offsetting benefits. Especially with temperatures approaching 75° C. or higher, undesirable reaction of fumaryl dichloride with dimethylformamide may be encountered if the concentration of the latter is too great. Use of a diluted reaction medium will, however, minimize this.

Other formamides include formamide itself and disubstituted formamides such as N,N-diethylformamide, N,N-methylformamide and N,N-phenylethylformamide, among others, having the characteristic formamide group,

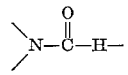

While the invention has been described by reference to specific details of certain embodiments, it is to be understood that the invention is not intended to be restricted to such details except insofar as they appear in the appended claims.

I claim:
1. A method of preparing fumaryl dichloride which comprises contacting phosgene and fumaric acid in the presence of formamide catalyst at a temperature of 30° C. to 75° C. whereby to form fumaryl dichloride by reaction of two moles of phosgene per mole of fumaric acid.

2. A method of preparing fumaryl dichloride which comprises contacting at a temperature of from 30° C. to 75° C. phosgene and fumaric acid in inert liquid organic solvent containing catalytic concentration of dimethylformamide and forming fumaryl dichloride by reaction of two moles of phosgene per mole of fumaric acid.

3. The method of preparing fumaryl dichloride which comprises reacting in the mole ratio of two to one phosgene and fumaric acid at a temperature of from 30° C. to 75° C. in an inert organic solvent having a normal boiling point above the reaction temperature containing from 0.01 to 0.1 mole of dimethylformamide per mole of fumaric acid and forming fumaryl dichloride.

4. The method of claim 3 wherein the organic solvent is a benzene.

5. The method of claim 3 wherein the organic solvent is a chlorobenzene.

6. A method of preparing fumaryl dichloride from phosgene and fumaric acid which comprises incorporating phosgene and fumaric acid in a liquid medium provided by an inert organic solvent containing formamide catalyst at a temperature of from 30° C. to 75° C. whereby to form fumaryl dichloride by reaction of two moles of phosgene per mole of fumaric acid.

References Cited by the Examiner
UNITED STATES PATENTS

| | | | |
|---|---|---|---|
| 2,013,989 | 9/1935 | Meder et al. | 260—544 |
| 2,279,985 | 4/1942 | Graenacher et al. | 260—544 X |
| 2,653,168 | 9/1953 | Spatz | 260—544 |
| 2,657,233 | 10/1953 | Carnahan | 260—544 |

FOREIGN PATENTS

| | | |
|---|---|---|
| 193,399 | 11/1957 | Austria. |
| 284,617 | 8/1913 | Germany. |
| 851,684 | 10/1960 | Great Britain. |

LORRAINE A. WEINBERGER, *Primary Examiner.*
CHARLES B. PARKER, *Examiner.*